Figure 1:
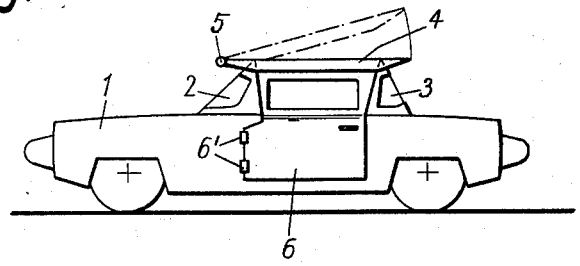

Aug. 2, 1960  B. BARÉNYI  2,947,567

AUTOMOBILE TOP STRUCTURE

Filed June 18, 1956

INVENTOR
BELA BARENYI
BY Dicke and Craig
ATTORNEYS.

United States Patent Office 2,947,567
Patented Aug. 2, 1960

2,947,567

AUTOMOBILE TOP STRUCTURE

Béla Barényi, Stuttgart-Vaihingen, Germany, assignor to Daimler-Benz Aktiengesellschaft, Stuttgart-Unterturkheim, Germany Filed June 18, 1956, Ser. No. 591,873

9 Claims. (Cl. 296—28)

The present invention relates to new improvements in automobiles, and more particularly in passenger cars.

It is an object of the present invention to provide a new and improved body structure, the central top portion of which forms an element independent of the windshield and rear portions of the car and may be opened by being tilted upwardly about an axis transverse to the longitudinal direction of the vehicle.

Although prior to this invention there have been similar body structures in which the central roof portion covering the passenger compartment could be tilted upwardly about a transverse axis, such axis was generally disposed approximately at the elbow level of the car's passengers or at least no higher than the lower edge of the windshield. This had the considerable disadvantage that the pivotable portion had to be very large and had to be opened very widely to permit an easy access into the car. According to another design, the top portion was pivotable about a transverse axis at the rear end thereof, and it was therefore tilted upwardly toward the rear with the resulting danger that, unless it was securely fastened, it might fly up of its own accord when struck by the wind at a high driving speed.

It is another object of the invention to provide a top and body structure which overcomes the above-mentioned disadvantages by providing a central top portion so as to be tiltable in a forward direction about a transverse axis which is disposed substantially at the level of the upper edge of the windshield and at a substantial distance in front thereof.

Another feature of the invention consists in the provision of means for pivoting the entire top or roof portion of the car upwardly and forwardly about such transverse axis so as to permit an easy access into the car. The arrangement of such pivotal axis substantially at the level of the upper edge of the windshield and hence at the ledaing end of the vehicle absolutely prevents the top from unintentionally opening and flying upwardly when struck by the driving wind, even though the means for securing the top in the downward position might accidentally be unlocked.

A further object of the invention is to provide the pivotable top portion with at least one downwardly depending side portion so as to replace one or both doors of the car and permit an easy access to the interior thereof when the entire top portion is raised.

Further objects, features, and advantages of the present invention will be apparent from the following detailed description thereof, as well as from the accompanying drawings, in which—

Figure 2:
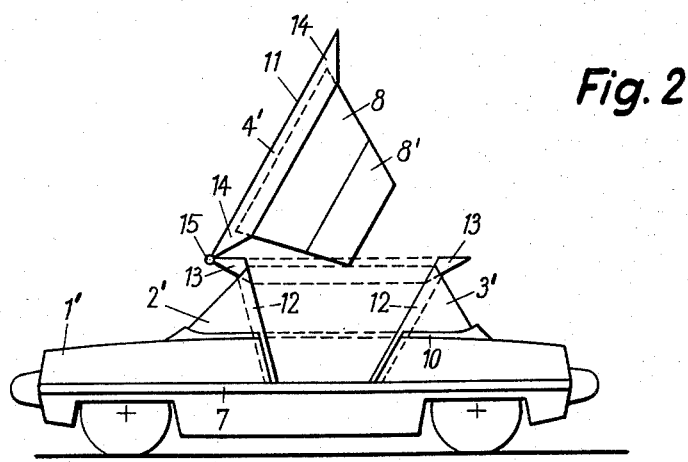
Figure 3:
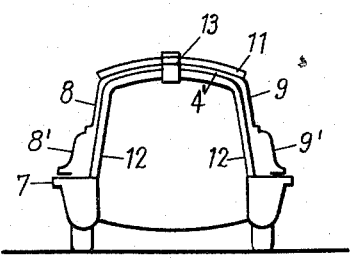

Fig. 1 shows a side view of a car designed according to the invention, in which the central top portion may be pivoted upwardly from its closed position about a transverse axis which is disposed substantially at the level and in front of the upper edge of the windshield;

Fig. 2 shows a side view of a car structure according to the invention, in which the central top portion shown in full lines in the open position, is provided with downwardly depending side walls which replace the usual doors of a car and may be opened by being tilted upwardly together with the top portion; while Fig. 3 shows a diagrammatic cross section through the car body according to Fig. 2, but with the top portion in the closed position.

Referring to the drawings, Fig. 1 shows a passenger car with a body 1, the upper part of which is preferably made separately from the lower part and comprises a windshield 2 and a rear window 3. The top or roof portion 4 is pivotably mounted at one or more hinges 5 so that it may be tilted upwardly from the closed position shown in full lines to an open position as shown in dot-and-dash lines. Hinge 5 is preferably secured to a forward projection on windshield 2 and its transverse pivotal axis is disposed substantially at the same level as the upper edge of the windshield but at a certain distance forwardly thereof so that the top 4 only needs to be tilted upwardly to a small extent to permit a person to enter through the doors 6 without stooping. Doors 6 may be of the conventional type and may be opened and closed about hinges 6'. Suitable means may also be provided to interlock the top 4 when in the closed position with the upper end of the doors 6 so as to prevent the doors from being opened unless the top has been raised. If there are no such interlocking means, other means may be provided to secure the top 4 in the closed position. Furthermore, adjustable means may be provided for maintaining the top in various tilted positions, one of which is shown in Fig. 1 in dot-and-dash lines, so as to permit the inside of the car 6 to be ventilated.

Fig. 2 illustrates a modification of the invention in which the sides of a car body 1' are provided with protection strips or rails 7 or the like which extend along a level intermediate the hub caps and the upper edges of the wheels and form the points of greatest width of the car. The lower car body 1' is again provided with an upper part which is made separate from the lower body and consists of front and rear walls comprised respectively by frame elements 12 and a windshield 2' and a rear window 3', and further consists of a substantially central portion of inverted U-shape which forms a top 4' and a pair of side walls 8 and 9 depending downwardly therefrom. These side walls 8 and 9 extend farther downwardly than the lower portions 10 of the front and rear windows 2' and 3', and up to the upper edge of the protection strips 7. If desired, the lower edge of each side wall 8 and 9 may also be made to engage or interlock with the protection strip 7 when the top is in the down position. Furthermore, the lower portions 8' and 9' of side walls 8 and 9 may be of solid or opaque material, while the upper portions should be transparent so as to act as side windows. The windshield 2' and the rear window 3' are made separately from the top 4' including its side walls 8 and 9 and are secured to the lower body 1'. The actual top portion 4' is further provided with a second outer roof portion 11 which is firmly secured thereto, and extends forwardly and rearwardly beyond the top portion 4'. The outer roof 11 preferably forms a tunnellike structure which is secured to the top portion 4' only along the lateral edges thereof.

The entire top unit consisting of the roof portion 4, the side walls 8 and 9, and the outer roof 11 normally rests at the opposite ends 14 of roof 11 on forwardly and rearwardly projecting brackets 13 which are secured to frame element 12, which, in turn are secured to the lower body 1' and thus form a part of the frame structure thereof. The outer ends of brackets 13 extend so far outwardly toward the front and rear, respectively, that they will coincide with the outer pointed edges of the upwardly inclined ends 14 of roof 11. The free end of the front bracket 13 and forward end 14 of roof 11 are connected by one or more hinges 15 so as to be pivotable relative to each other about a horizontal transverse axis. The entire top unit when in the closed position will therefore be telescoped between and upon the frame elements 12 and the brackets 13, as indicated by the horizontal dotted lines in Fig. 2, the lower edges of side walls 8 and 9 then being parallel with and closely adjacent to the protection strips 7 or in interengaging relation therewith. Due to the cantileverlike connection of the outer roof 11 to the front brackets 13, the entire top unit only needs to be pivoted upwardly to a small extent, as indicated in full lines in Fig. 2, to permit an easy access to or egress from the passenger compartment of the car. Rather than being connected by a hinge extending transversely at the end of the bracket 13, the forward roof end 14 may also be connected thereto by a pair of pivots at the lateral ends thereof.

While my invention has been illustrated and described with reference to the preferred embodiments thereof, I wish to have it understood that it is in no way limited to the details of such embodiments, but is capable of numerous modifications within the scope of the appended claims. Thus, for example, the pivotable top unit does not have to include the entire roof but the advantages according to the invention may also be obtained, for example, in cars with conventional doors, if only the front portion of the roof, that is, the portion directly over the doors, may be pivoted upwardly, while the rear portion, including the rear window, is stationary and rigidly connected to the lower body 1 or 1'.

Having thus fully disclosed my invention, what I claim is:

1. In combination with a motor vehicle having a lower body, front and rear walls having windows therein and secured to and projecting upwardly from said lower body, an upper body forming a roof normally disposed substantially intermediate said front and rear walls and connecting the same, said upper body having at least one extension projecting forwardly of said front wall, a bracket near the upper end of said front wall and projecting forwardly thereof, means near the forward ends of said extension and said bracket for pivotally connecting the same about a substantially horizontal transverse axis so as to permit said roof to be tilted upwardly from its closed position to an open position, and means for locking said upper body in the closed position.

2. In a combination as defined in claim 1, in which said upper body has another extension projecting toward the rear of the upper end of said rear wall when said upper body is in the closed position.

3. In combination with a motor vehicle having a lower body with an opening in at least one side wall thereof, front and rear walls having windows therein and secured to and projecting upwardly from said lower body, and a further opening defined by the upper ends of said front and rear walls an upper body forming a roof and at least one side wall secured to and depending from said roof, said upper body being adapted substantially to close said opening in at least one side wall as well as said further opening when said upper body is in the closed position, said upper body having at least one extension projecting forwardly of said front wall, a bracket near the upper end of said front wall and projecting forwardly thereof, means near the forward ends of said extension and said bracket for pivotally connecting the same about a substantially horizontal transverse axis so as to permit said roof together with said depending side wall thereon to be tilted upwardly from a closed position to an open position thereof, and means for locking said upper body in the closed position.

4. In combination with a motor vehicle having a lower body with an opening in at least one side wall thereof, front and rear walls having windows therein and secured to and projecting upwardly from said lower body, said front and rear walls being separated by an opening defined by the upper ends of said front and rear walls, respectively, an upper body comprising a roof, at least one side wall secured to and depending from said roof, said roof and said depending side wall when in the closed position nesting in said openings and closing the same, and a second roof rigidly secured to and superimposed upon said first roof and having extensions projecting forwardly and rearwardly over said upper ends of said front and rear walls, respectively, when said upper body is in the closed position, a bracket near the upper end of each of said front and rear walls and projecting forwardly and rearwardly thereof, respectively, means near the front end of said forward extension of said second roof and the front end of said front bracket for pivotally connecting the same about a substantially horizontal transverse axis so as to permit said entire upper body including said two roofs and said depending side wall to be tilted upwardly from a closed postion to an open position thereof, and means for locking said upper body in the closed position.

5. In combination with a motor vehicle having a lower body, front and rear walls each having window means therein, said front and rear walls being secured to and projecting upwardly from said lower body, an upper body forming a roof, means for pivotally supporting said upper body for movement into open and closed positions with reference to said lower body, said means comprising bracket means extending from said front wall in the forward direction of the vehicle pivot means carried by said bracket means and having a transverse horizontal axis disposed above and overlying said window means of said front wall, said roof having an integral part thereof cooperating with said pivot means and projecting forwardly of said front wall and disposed above and overlying said window means of said front wall.

6. In combination with a motor vehicle according to claim 5, wherein said lower body is provided with doors intermediate said front and rear walls, said upper body when in said closed position engaging the upper edges of said front and rear walls and the upper edges of said doors.

7. In combination with a motor vehicle according to claim 6, wherein means are provided for securing said upper body to said doors when said upper body is in said closed position.

8. In combination with a motor vehicle according to claim 5, wherein said front and rear walls are spaced by lateral openings, said upper body further comprising depending side walls, said walls substantially closing said openings when said upper body is in said closed position.

9. In combination with a motor vehicle according to claim 9, wherein means are provided for additionally securing said upper body to at least one body wall when said upper body is in said closed position.

References Cited in the file of this patent

UNITED STATES PATENTS

| 1,868,382 | Coadou | July 19, 1932 |
| 1,872,077 | Forbes | Aug. 16, 1932 |
| 2,122,831 | Atwood et al. | July 5, 1938 |
| 2,533,548 | Backer | Dec. 12, 1950 |

FOREIGN PATENTS

| 1,036,569 | France | Apr. 29, 1953 |

(Corresponding U.S. 2,777,728, Jan. 15, 1957)

| 709,078 | Germany | Aug. 5, 1941 |
| 851,304 | Germany | Oct. 2, 1952 |
| 452,110 | Great Britain | Aug. 17, 1936 |
| 435,563 | Italy | May 18, 1948 |

OTHER REFERENCES

The Autocar, Dec. 17, 1937, page 1198, article "A Non-Stoop Roof."